(12) United States Patent
Akiyama et al.

(10) Patent No.: US 9,897,761 B2
(45) Date of Patent: Feb. 20, 2018

(54) OPTICAL FIBER MOUNTED PHOTONIC INTEGRATED CIRCUIT DEVICE FOR SINGLE MODE OPTICAL FIBERS

(71) Applicants: FUJITSU LIMITED, Kawasaki-shi, Kanagawa (JP); Photonics Electronics Technology Research Association, Bunkyo-ku, Tokyo (JP)

(72) Inventors: Tomoyuki Akiyama, Yokohama (JP); Tsuyoshi Aoki, Machida (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/444,523

(22) Filed: Feb. 28, 2017

(65) Prior Publication Data

US 2017/0276879 A1    Sep. 28, 2017

(30) Foreign Application Priority Data

Mar. 25, 2016   (JP) ................................. 2016-061829

(51) Int. Cl.
  *G02B 6/30*   (2006.01)
(52) U.S. Cl.
  CPC .................... *G02B 6/305* (2013.01)
(58) Field of Classification Search
  CPC .................. G02B 6/30; G02B 6/305
  See application file for complete search history.

(56) References Cited

U.S. PATENT DOCUMENTS

| 4,688,883 A * | 8/1987 | Blaha ................. G01D 5/35303 385/13 |
| 2016/0299294 A1* | 10/2016 | Wang ................... G02B 6/1221 |
| 2017/0276879 A1* | 9/2017 | Akiyama ............... G02B 6/305 |

FOREIGN PATENT DOCUMENTS

| JP | H05-257034 A | 10/1993 |
| JP | H07-128543 A | 5/1995 |

* cited by examiner

*Primary Examiner* — Andrew Jordan
(74) *Attorney, Agent, or Firm* — Kratz, Quintos & Hanson LLP

(57) ABSTRACT

The invention relates to an optical fiber mounted photonic integrated circuit device where the tolerance in the positioning of the coupling between a single mode optical fiber and an optical waveguide provided in the photonic integrated circuit device is increased. A second optical waveguide of which the cross-section of the core is in the form of a slab having a width that is greater than the mode diameter of the single mode optical fiber, and which is tapered in such a manner that the thickness of the core is reduced as the location is closer to the connection portion with the single mode optical fiber, is provided on the input/output end side of the first optical waveguide through which light propagates in such a manner that the inclined connection end surface of the single mode optical fiber is coupled to the upper surface of the second optical waveguide.

12 Claims, 15 Drawing Sheets

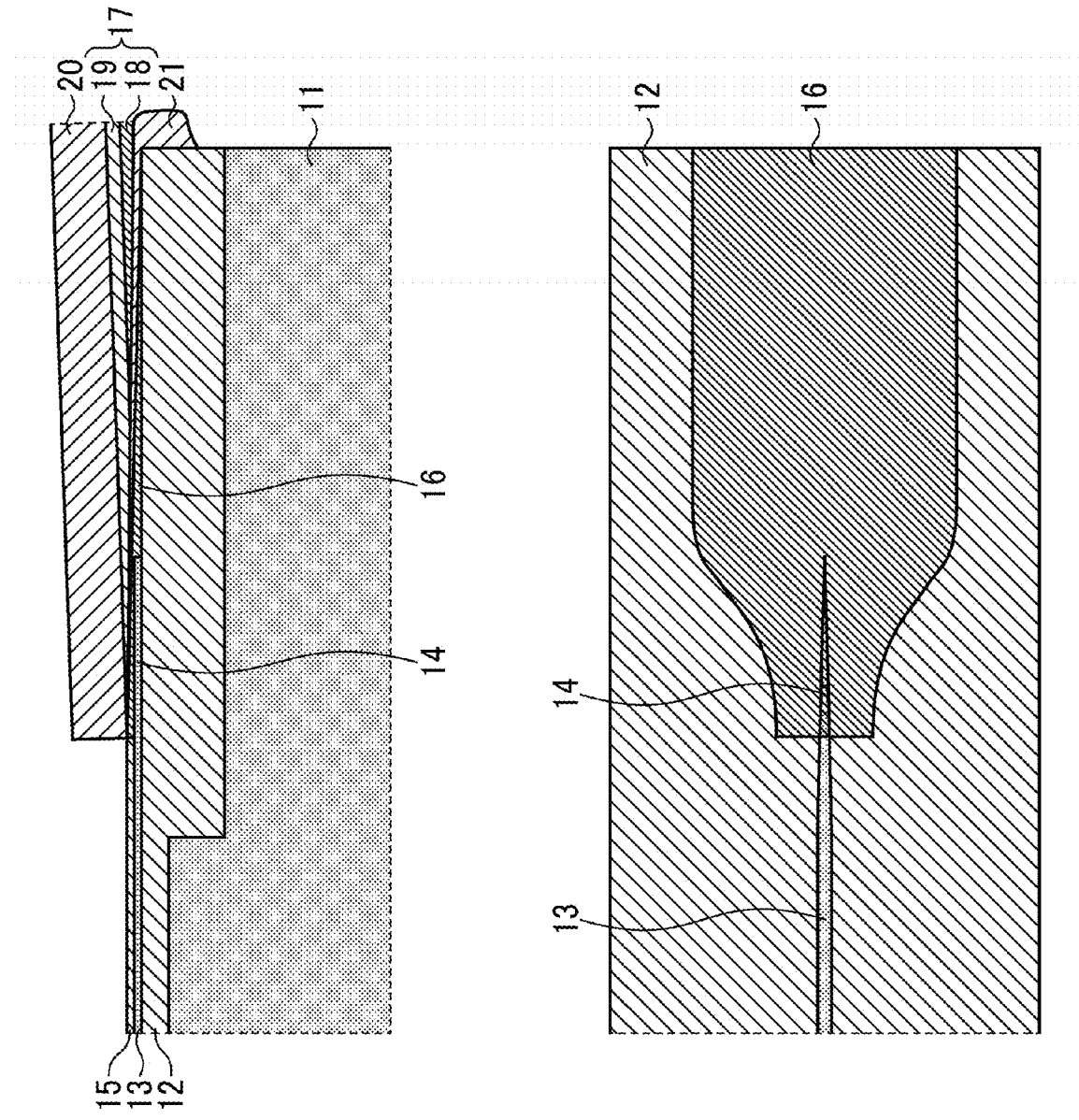

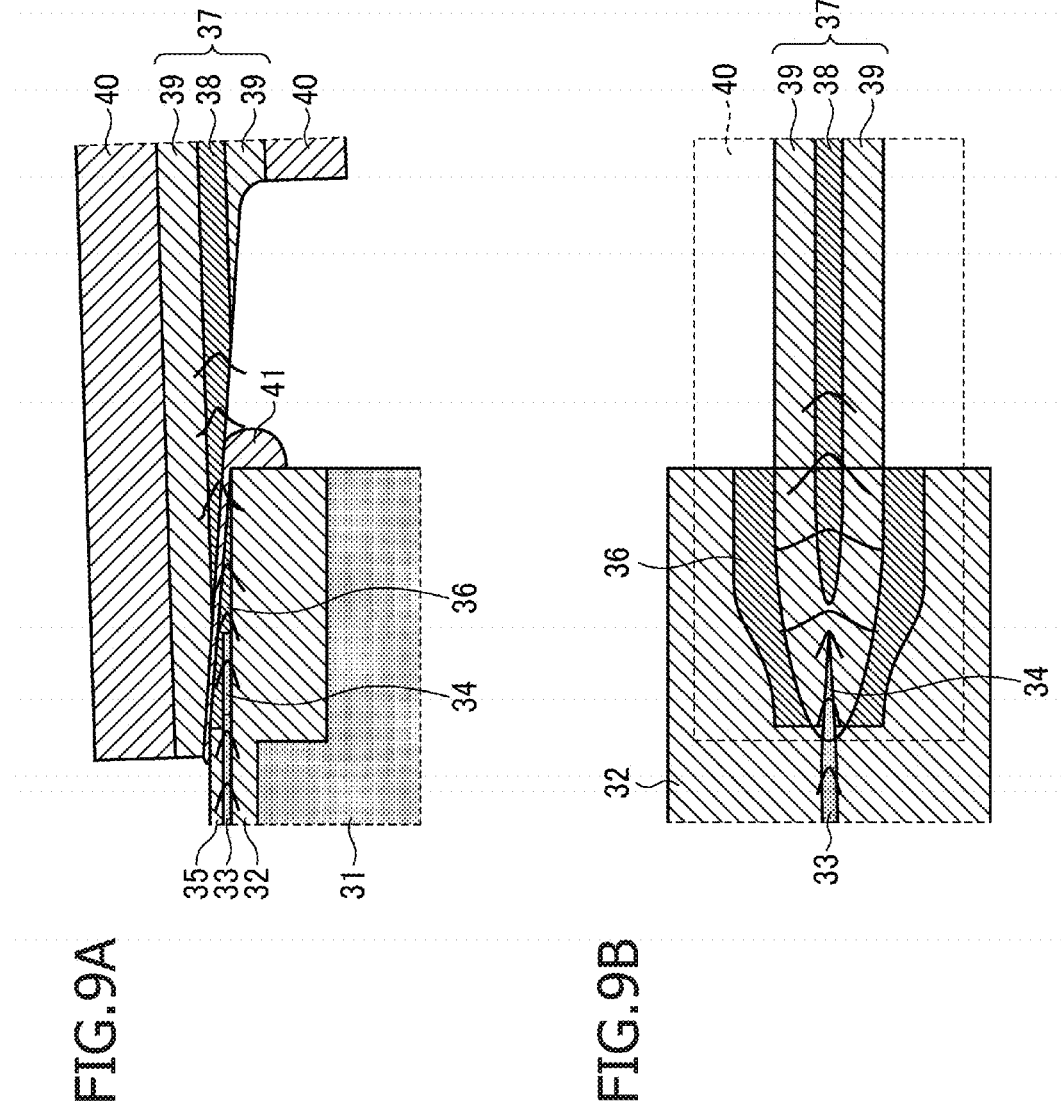

OPTICAL FIBER MOUNTED PHOTONIC INTEGRATED CIRCUIT DEVICE FOR SINGLE MODE OPTICAL FIBERS

CROSS-REFERENCE TO RELATED APPLICATION

This application is based upon and claims the benefit of priority of the prior Japanese Patent Application No. 2016-061829, filed on Mar. 25, 2016, the entire contents of which are incorporated herein by reference.

FIELD

The present invention relates to an optical fiber mounted optical integrated circuit device, and to an optical connection structure in a silicon photonic integrated circuit (PIC) device where optical fibers and optical parts are mounted in high density, for example.

BACKGROUND

In order to implement an optical transceiver made of one chip that covers the capacity of a class of terabits per second, it is necessary to use single mode optical fibers as the optical fibers used for light transmission in the case of wavelength division multiplexing or long distance transmission.

Si photonic wire waveguides used for silicon PIC's have a size as small as one $\mu m$ or less, and therefore are appropriate for high integration. However, the size is greatly different from that of single mode optical fibers, and therefore, it is a theme to enhance the efficiency in the coupling of the Siphotonic wire waveguides with optical fibers.

According to a conventional method, a spot size converter of which an end is tapered is used to make the spot size compatible with an optical fiber in order to enhance the efficiency in the coupling with an optical fiber. FIGS. 15A and 15B are diagrams illustrating a conventional optical fiber mounted photonic integrated circuit device. FIG. 15A is a cross-sectional diagram along the optical axis, and FIG. 15B is a plan diagram where the main portions can be clearly seen from the top.

An SOI wafer is used in such a manner that a Si fine wire core 63 having a thickness of 0.25 $\mu m$ is provided on top of a silicon substrate 61 with a BOX layer 62 that also works as a lower clad layer in between. A spot size converter 64 of which an end is tapered is provided to an end of the Si fine wire core 63. A $SiO_2$ film is provided on the upper surface of the Si fine wire core 63 as an upper clad layer 65, and a wide SiON core 66 is provided so as to cover the sides of the spot size converter 64. A single mode optical fiber 67 is arranged so that the core 68 faces the SiON core 66. Here, 69 and 70 in the figures are a clad and a ferrule, respectively.

As illustrated in the figures, the propagating light beam having a spot diameter of approximately 0.25 $\mu m$ is expanded through the spot size converter 64 so that the spot diameter is approximately 9 $\mu m$ in the SiON core 66 when the light beam enters into the core 68 of the single mode optical fiber 67.

PRIOR ART LITERATURE

Patent Literature

Patent Literature 1: Japanese Laid-open Patent Publication No. H07 (1995)-128543

Patent Literature 2: Japanese Laid-open Patent Publication No. H05 (1993)-257034

SUMMARY

In the case of the mounting structure in FIGS. 15A and 15B, the spot size of the single mode optical fiber is approximately 9 $\mu m$, and therefore, only a shift in the position of several $\mu m$ is allowed when positioning, and thus, fiber positioning with high precision is required. Accordingly, active alignment is required where light is made to pass through the Si fine wire core, and positioning can be done so that the coupled optical power becomes maximum. Thus, a problem arises that the mounting cost is high as compared to systems where a multimode fiber having a larger diameter is used.

An optical fiber mounted photonic integrated circuit device, including:

a photonic integrated circuit device configured to be provided with an optical waveguide on a substrate; and a single mode optical fiber having an inclined connection end surface configured to be optically coupled to the optical waveguide and incline relative to the direction in which light propagates, wherein the optical waveguide is formed of a first optical waveguide through which light propagates and a second optical waveguide that is coupled to the first optical waveguide on the input/output end side of the first optical waveguide, the cross-section of the core of the second optical waveguide is in the form of a slab having a width that is greater than the mode diameter of the single mode optical fiber, and the second optical waveguide is tapered in such a manner that the thickness of the core is reduced as the location is closer to the connection portion with the single mode optical fiber, and the inclined connection end surface of the single mode optical fiber and the upper surface of the core of the second optical waveguide face each other for coupling.

According to one aspect of the invention, it becomes possible to increase the tolerance in the positioning of the coupling between a single mode optical fiber and an optical waveguide provided in a photonic integrated circuit device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams illustrating the optical fiber mounted photonic integrated circuit device according to an embodiment of the present invention.

FIGS. 9A and 9B are diagrams illustrating the optical fiber mounted photonic integrated circuit device according to Example 1 of the present invention.

DESCRIPTION OF EMBODIMENTS

Figure 2A:
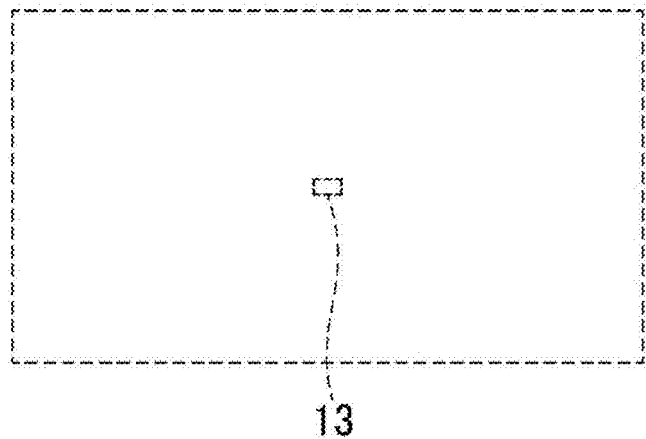
FIGS. 2A through 2C are diagrams illustrating how light propagates from the first optical waveguide to the second optical waveguide.

In reference to FIGS. 1 through 8, the optical fiber mounted photonic integrated circuit device according to an embodiment of the present invention is described below. FIGS. 1A and 1B are diagrams illustrating the optical fiber mounted photonic integrated circuit device according to an embodiment of the present invention. FIG. 1A is a cross-sectional diagram along the optical axis, and FIG. 1B is a plan diagram where the main portions can be clearly seen from the top. As illustrated in the figures, the core 13 of the first optical waveguide is provided on a substrate 11 with a lower clad layer 12 in between, and the core 16 of the second optical waveguide is provided on the input/output end side of the core 13 of the first optical waveguide. Here, it is desirable to provide a spot size converter 14 at the input/output end of the core 13 of the first optical waveguide. Here, the shape of the spot size converter 14 may be tapered in the direction of the width or in the direction of the thickness.

The core 16 of the second optical waveguide is in a tapered shape where the cross-section of the core is in the form of a slab with a width greater than the mode diameter of the single mode optical fiber 17, and the thickness of the core decreases as the location is closer to the connection portion with the single mode optical fiber 17. It is also desirable to provide such a structure that the width of the core of the second optical waveguide gradually widens as the location is closer to the coupling portion with the single mode optical fiber 17, where it is desirable for the width of the core to be two times or more greater than the mode diameter of the single mode optical fiber 17. In addition, it is desirable for the refractive index of the core 16 of the second optical waveguide to be smaller than the refractive index of the core 13 of the first optical waveguide.

The single mode optical fiber 17 is provided with an inclined connection end surface so that this inclined connection end surface and the upper surface of the core 16 of the second optical waveguide face each other for coupling. It is desirable for a transparent member 21 such as a resin or a liquid that is transparent for the propagating light, for example, a transparent oil, to intervene between the inclined connection end surface of the single mode optical fiber 17 and the upper surface of the core 16 of the second optical waveguide. The transparent member 21 may be a material of which the refractive index is close to that of the clad 19 of the single mode optical fiber. In the case where the transparent member 21 is a liquid, it is preferable for it to be difficult to volatilize. In the case where a resin is used, it may be a transparent resin that is used for conventional optical devices. Here, the angle of the inclined connection end surface can be 80° or greater so that the coupling loss can be lowered, and the closer to 90° this angle is, the better.

A silicon photonic integrated circuit device can be cited as an example of the photonic integrated circuit device. In this case, an SOI wafer is used in such a manner that the BOX layer is used for the lower clad layer 12, and the core 13 of the first optical waveguide is a silicon fine wire core. In addition, it is desirable to use SiON of which the refractive index is smaller than that of Si or Ge-doped $SiO_2$ for the core 16 of the second optical waveguide. Furthermore, $SiO_2$ may be used for the upper clad layer 15. In the case where an SOI wafer is not used, the fine wire core may be made of SiON having a high N concentration instead of the Si fine wire core.

The single mode optical fiber 17 is fitted to a ferrule 20 to be fixed to the photonic integrated circuit device side. The ferrule is provided with a first engagement mechanism, and at the same time, the substrate 11 of the photonic integrated circuit device is provided with a second engagement mechanism which engages with the first engagement mechanism. At this time, it is desirable to further provide a weight applying mechanism that applies weight on the photonic integrated circuit side at the time of engagement.

When light in the core 13 of the first optical waveguide is guided into the core 16 of the second optical waveguide that is in the form of a flat slab, the spot expands to a range that is wider than the diameter of the core 18 of the single mode optical fiber 17. When the core 16 of the second optical waveguide in the form of a slab is tapered in the direction of the thickness, the light spot in the core 16 of the second optical waveguide in the form of a slab expands in the vertical direction. At the same time, the light spot is coupled to the core 18 of the single mode optical fiber 17 through the inclined connection end surface of the single mode optical fiber 17.

Figure 2B:
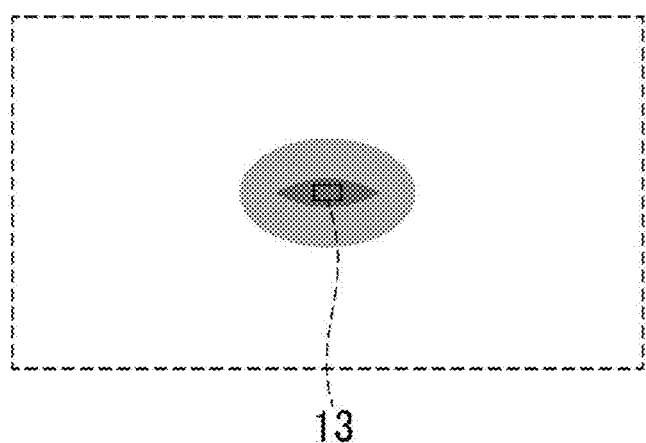
Figure 2C:
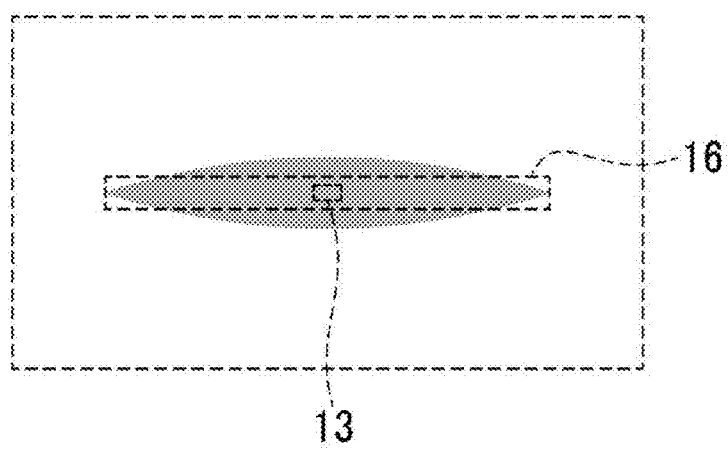

FIGS. 2A through 2C are diagrams illustrating how light propagates from the first optical waveguide to the second optical waveguide and exhibiting the results of calculation in accordance with a beam propagation method (BPM). As light propagates from the core 13 of the first optical waveguide to the core 16 of the second optical waveguide in the order of FIG. 2A, FIG. 2B and FIG. 2C, the cross-section of the light beam becomes flatter.

Figure 3A:
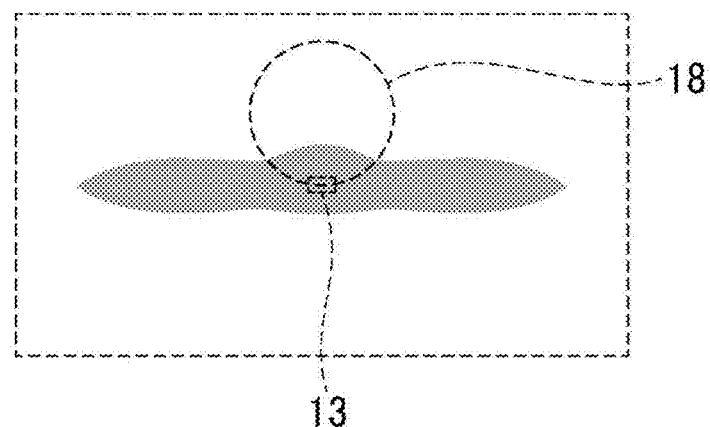
FIGS. 3A through 3C are diagrams illustrating how light propagates from the second optical waveguide to the optical fiber in the case where the optical fiber is located at the center.
Figure 3B:
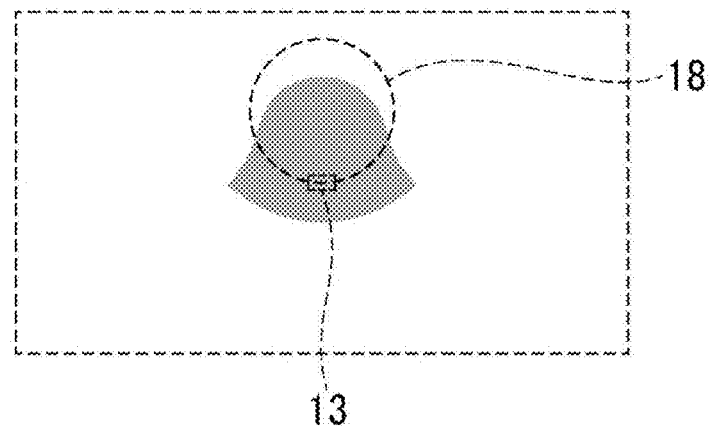
Figure 3C:
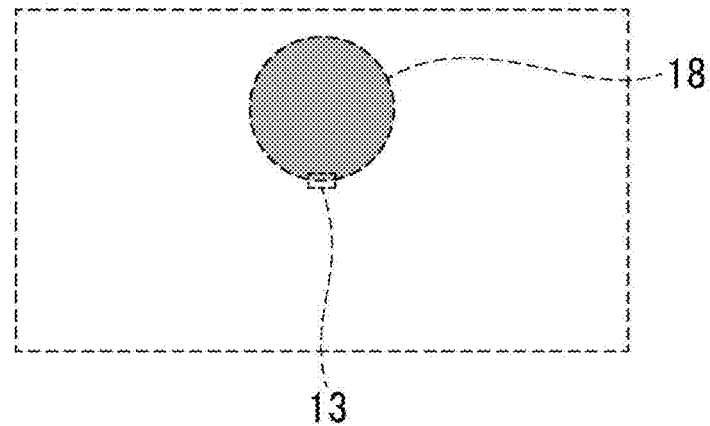

FIGS. 3A through 3C are diagrams illustrating how light propagates from the second optical waveguide to the optical fiber in the case where the optical fiber is located at the center and exhibiting the results of calculation in accordance with the BPM as well. In the case where the optical axis of the single mode optical fiber 17 and the optical axis of the core 13 of the first optical waveguide are aligned, light moves from the core 16 of the second optical waveguide to the core 18 of the single mode optical fiber 17 without much loss in the order of FIG. 3A, FIG. 3B and FIG. 3C.

Figure 4A:
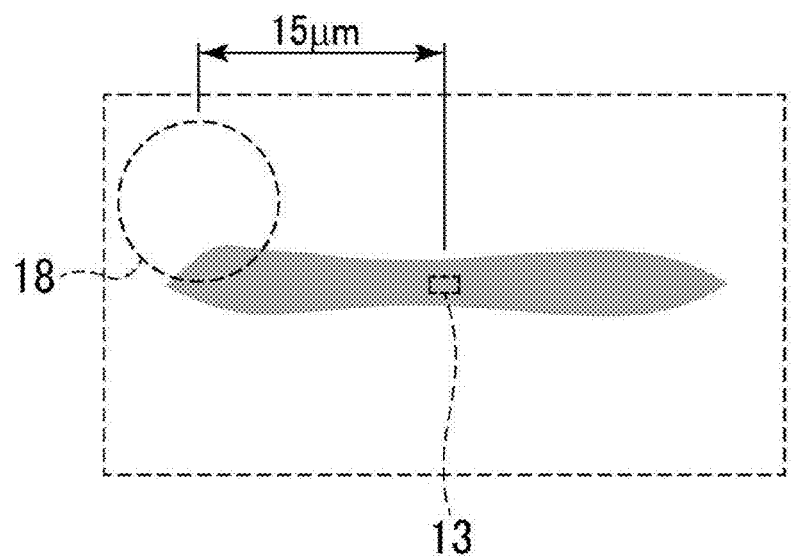
FIGS. 4A through 4C are diagrams illustrating how light propagates from the second optical waveguide to the optical fiber in the case where the optical fiber is shifted to the left.
Figure 4B:
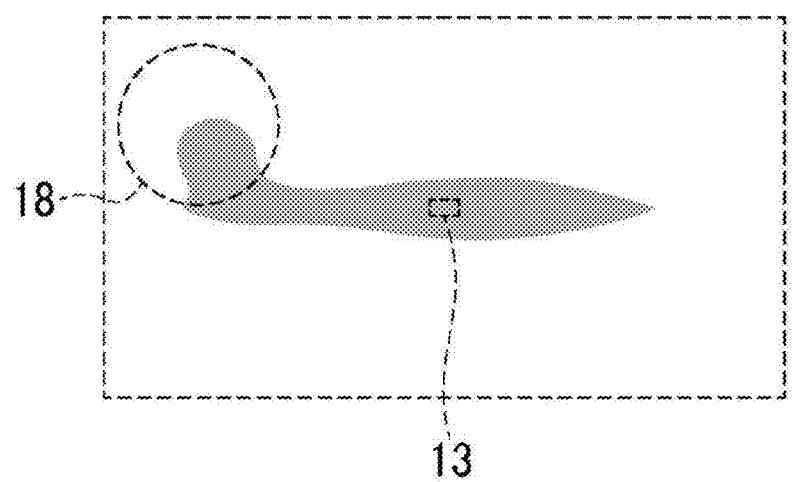
Figure 4C:
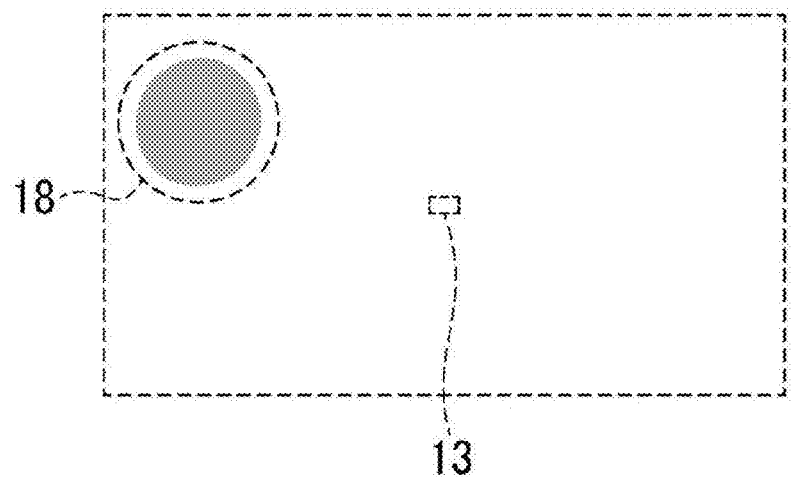

FIGS. 4A through 4C are diagrams illustrating how light propagates from the second optical waveguide to the optical fiber in the case where the optical fiber is shifted to the left and exhibiting the results of calculation in accordance with the BPM as well. In the case where the optical axis of the single mode optical fiber 17 and the optical axis of the core 13 of the first optical waveguide are shifted away from each other by 15 μm, light again moves from the core 16 of the second optical waveguide to the core 18 of the single mode optical fiber 17 without much loss in the order of FIG. 4A, FIG. 4B and FIG. 4C. Accordingly, it is confirmed that the optical power is coupled to the single mode optical fiber 17 irrelevant of the location of the single mode optical fiber 17.

Figure 5A:
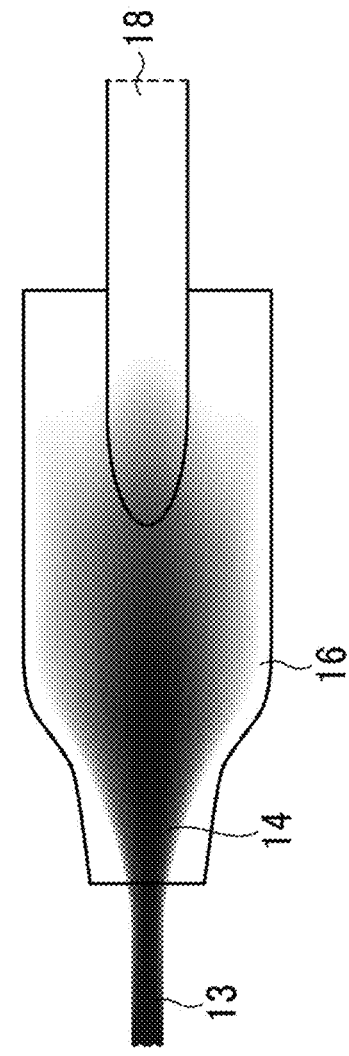
FIGS. 5A and 5B are diagrams illustrating the spatial distribution of the optical power in the embodiment of the present invention.
Figure 5B:
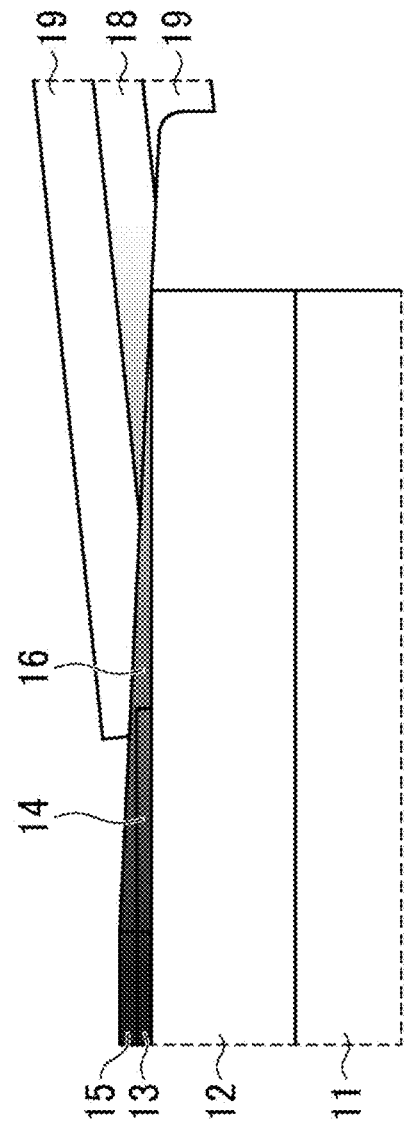

FIGS. 5A and 5B are diagrams illustrating the spatial distribution of the optical power in the embodiment of the present invention. FIG. 5A illustrates the spatial distribution of the optical power as viewed from the top, and FIG. 5B illustrates the spatial distribution of the optical power in the cross-section along the optical axis. It can be seen from the figures how the light in the core 13 of the first optical waveguide spreads in the core 16 of the second optical waveguide in the form of a slab, and after that, how the optical power is coupled to the core 18 of the single mode optical fiber 17 having the inclined connection end surface. Here, FIG. 5A illustrates the spatial distribution of the optical power in proximity to the portion lower than the inclined connection end surface of the single mode optical fiber 17, and therefore, the optical power is lower as the light propagates through the single mode optical fiber 17.

Figure 6A:
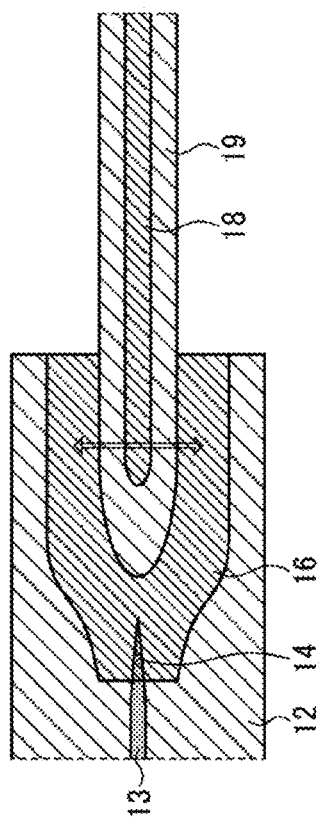
FIGS. 6A and 6B are a diagram and a graph illustrating the tolerance in the lateral direction in the embodiment of the present invention.
Figure 6B:
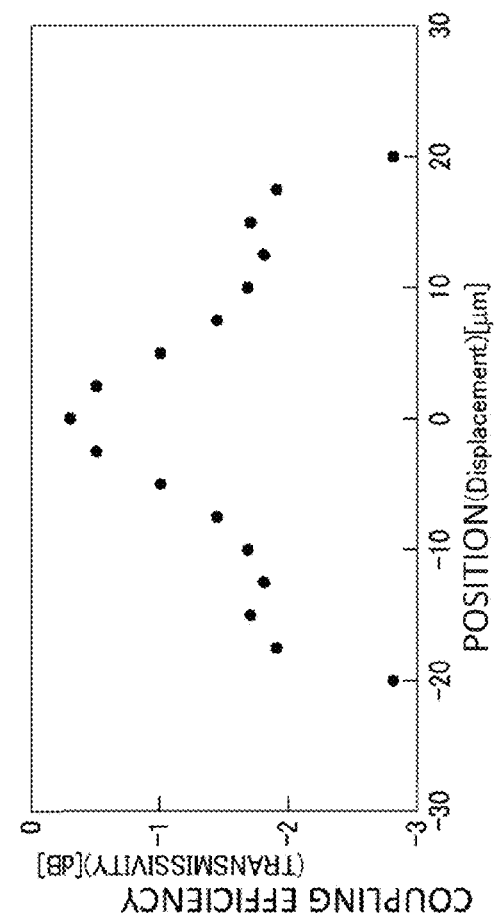
Figure 15A:
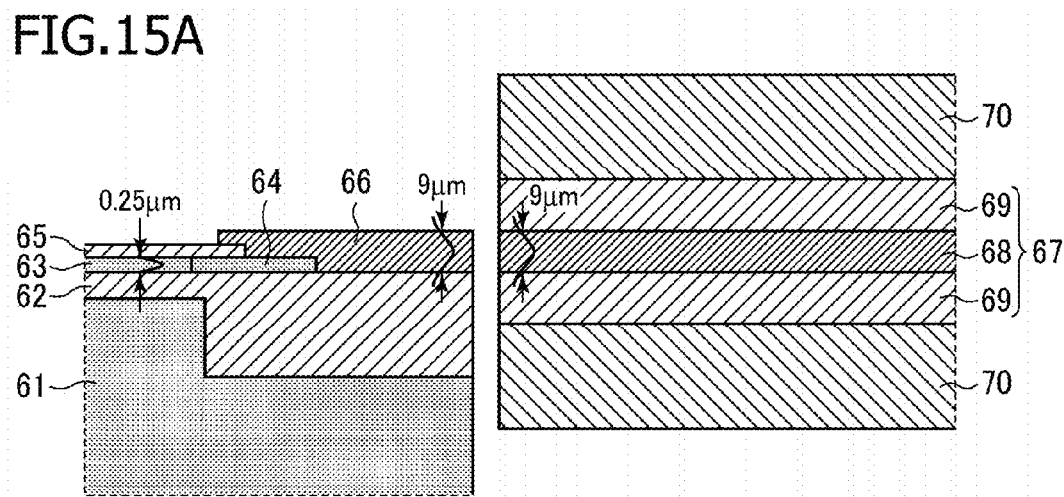
FIGS. 15A and 15B are diagrams illustrating a conventional optical fiber mounted photonic integrated circuit device.
Figure 15B:
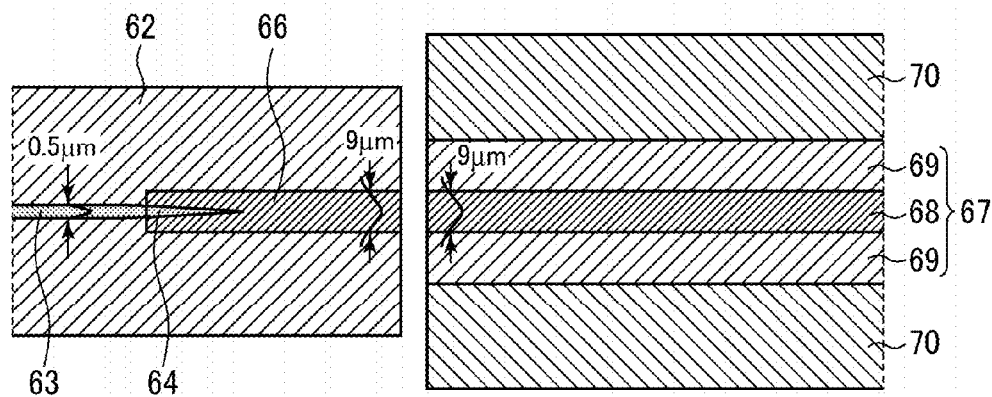

FIGS. 6A and 6B are a diagram and a graph illustrating the tolerance in the lateral direction in the embodiment of the present invention. FIG. 6A is a plan diagram as viewed from the top illustrating how the optical waveguide and the single mode optical fiber are arranged, and FIG. 6B exhibits the results of calculation of the power coupling efficiency between the Si fine wire core and the single mode optical fiber in accordance with the BPM. In the case where the single mode optical fiber 17 is shifted in the lateral direction (in the upward and downward directions in the figure) as illustrated in FIG. 6A, a coupling efficiency of −2 dB or greater is gained in the bandwidth of 35 μm as illustrated in FIG. 6B. This exhibits that a shift that is approximately the same as the width of the core 16 of the second optical waveguide in the form of a slab (40 μm) is tolerable. In addition, an improvement of one digit or more can be seen as compared to the fact that the tolerance (loss <2 dB) in the lateral direction in the conventional optical fiber mounted photonic integrated circuit device in FIG. 15 is approximately 3 μm.

Figure 7A:
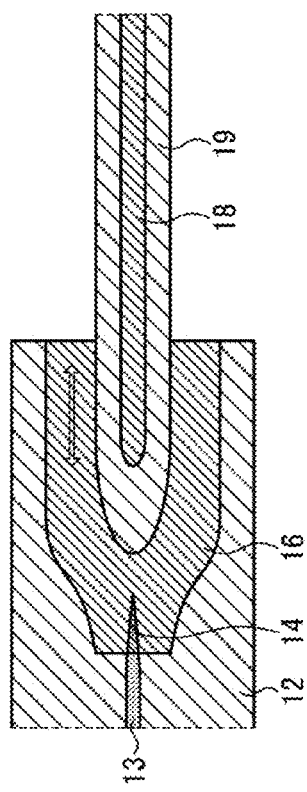
FIGS. 7A and 7B are a diagram and a graph illustrating the tolerance in the direction of the optical axis in the embodiment of the present invention.
Figure 7B:
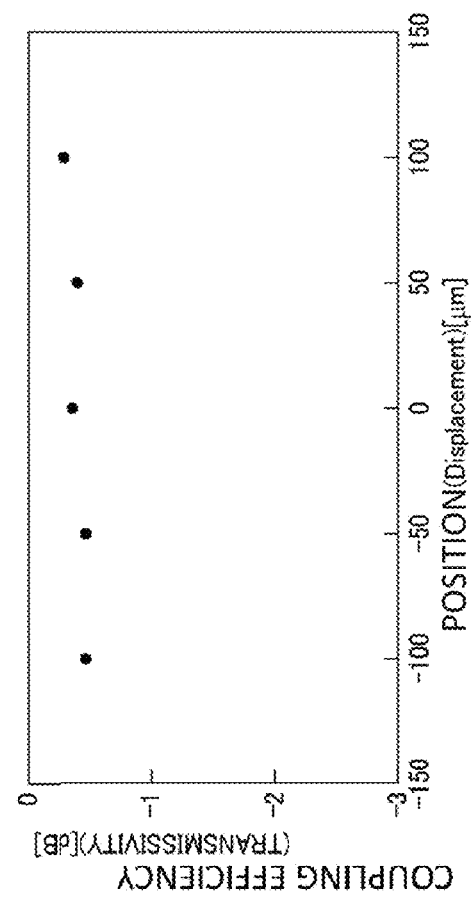

FIGS. 7A and 7B are a diagram and a graph illustrating the tolerance in the direction of the optical axis in the embodiment of the present invention. FIG. 7A is a plan diagram as viewed from the top illustrating how the optical waveguide and the single mode optical fiber are arranged. FIG. 7B illustrates the results of calculation of the power coupling efficiency between the Si fine wire core and the single mode optical fiber in accordance with the BPM. In the case where the single mode optical fiber 17 is shifted in the direction of the optical axis (in the left and right directions in the figure) as illustrated in FIG. 7A, there is almost no change in the coupling efficiency over a wide range of 200 μm as illustrated in FIG. 7B. The results indicate an improvement of two digits or more as compared to the fact that the tolerance (loss <2 dB) in the direction of the optical axis of the conventional optical fiber mounted photonic integrated circuit device in FIG. 15 is approximately 3 μm.

Figure 8A:
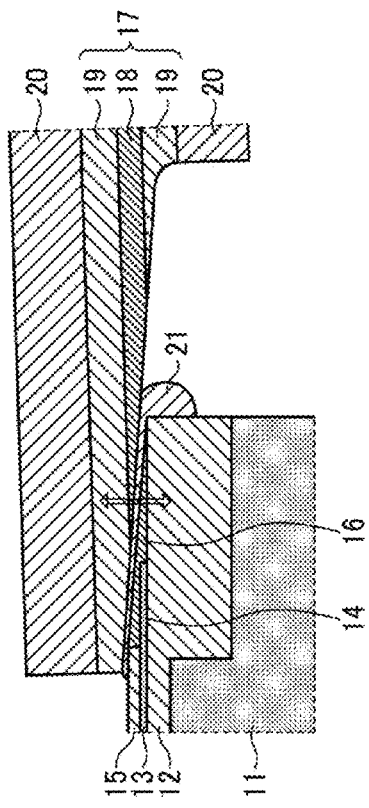
FIGS. 8A and 8B are a diagram and a graph illustrating the tolerance in the vertical direction in the embodiment of the present invention.
Figure 8B:
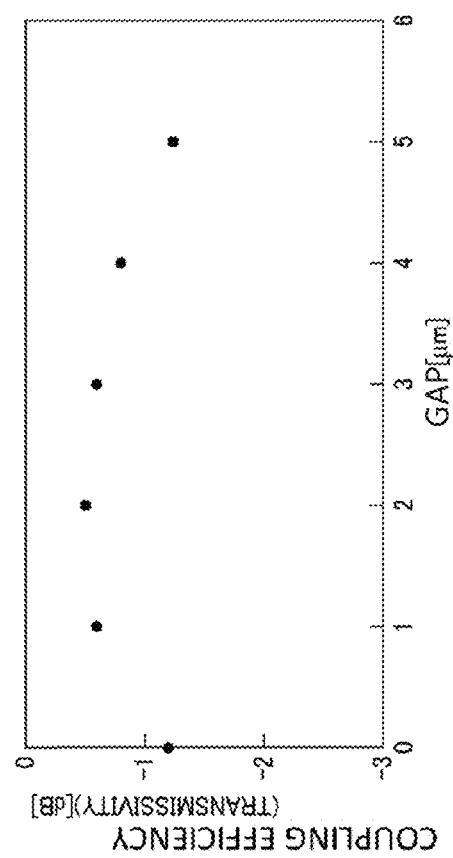

FIGS. 8A and 8B are a diagram and a graph illustrating the tolerance in the vertical direction in the embodiment of the present invention. FIG. 8A is a diagram as viewed from the top illustrating how the optical waveguide and the single mode optical fiber are arranged, and FIG. 8B exhibits the results of calculation of the power coupling efficiency between the Si fine wire core and the single mode optical fiber in accordance with the BPM. In the case where the single mode optical fiber 17 is shifted in the vertical direction (in the upward and downward directions in the figure) as illustrated in FIG. 8A, it can be seen from FIG. 8B that the shift in the vertical direction, that is to say, the gap between the core 16 of the second optical waveguide in the form of a slab and the inclined connection end surface of the single mode optical fiber 17, may be as great as approximately 5 μm. Here, this gap occurs due to the limit of precision in tapering the core 16 of the second optical waveguide in the form of a slab, the limit of precision in the process of the inclined connection end surface of the single mode optical fiber 17, or a foreign substance that may interfere between the core 16 and the inclined connection surface.

According to the embodiment of the present invention, the core 16 of the second optical waveguide is tapered so that the thickness of the core is reduced and is coupled to the inclined connection end surface of the single mode optical fiber 17, and therefore, the tolerance in the positioning when coupled to the single mode optical fiber can be increased.

EXAMPLE 1

Next, the optical fiber mounted photonic integrated circuit device according to Example 1 of the present invention is described in reference to FIGS. 9A through 12. FIGS. 9A and 9B are diagrams illustrating the optical fiber mounted photonic integrated circuit device according to Example 1 of the present invention. FIG. 9A is a cross-sectional diagram along the optical axis, and FIG. 9B is a plan diagram where the main portions can be clearly seen from the top. As illustrated in the figures, an SOI wafer is used in such a manner that an Si fine wire core 33 having a thickness of 0.25 μm and a width of 0.5 μm is provided on a silicon substrate 31 with a BOX layer 22, which also works as a lower clad layer, in between. A spot size converter 34 is provided on the input/output end side of the Si fine wire core 33. A SiON core 36 is provided so as to cover the spot size converter 34.

The SiON core 36 is in the form of a slab of which the core cross-section has a width greater than the mode diameter (9 μm) of the single mode optical fiber 37. The SiON core 36 is tapered so that the thickness is reduced from 0.5 μm to 0 μm. Here, the form of the SiON core 36 of which the width is reduced is not limited to that in the figure. The SiON core 36 may be tapered, but it is desirable for the width of the form to be gradually reduced in order to avoid undesired reflection from a portion where the form changes.

An inclined connection end surface is provided to the single mode optical fiber 37, which is arranged in such a manner that this inclined connection end surface and the upper surface of the SiON core 36 face each other and are coupled with a transparent oil 41 in between. 18061 (product number of the oil made by Cargille Labs Inc.) having a refractive index of 1.44 is used for the transparent oil 41. In addition, the coupling loss can be lowered by making the angle of the inclined connection end surface 80° or greater. The closer to 90° this angle is, the better, but here it is 88°.

Figure 10A:
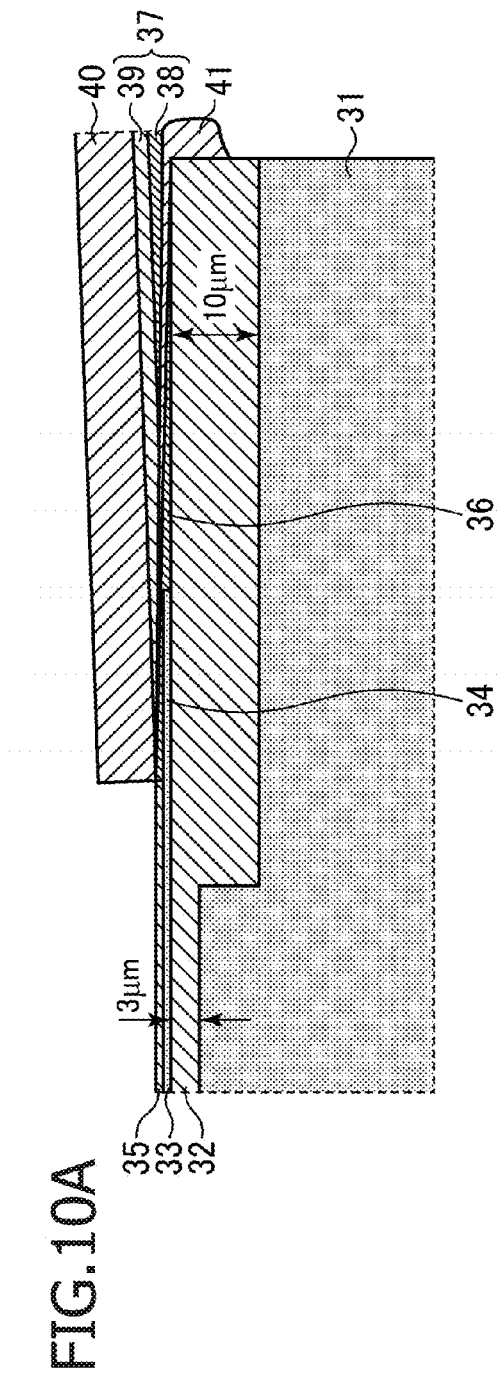
FIGS. 10A and 10B are diagrams illustrating the coupling portion in the optical fiber mounted photonic integrated circuit device according to Example 1 of the present invention.
Figure 10B:
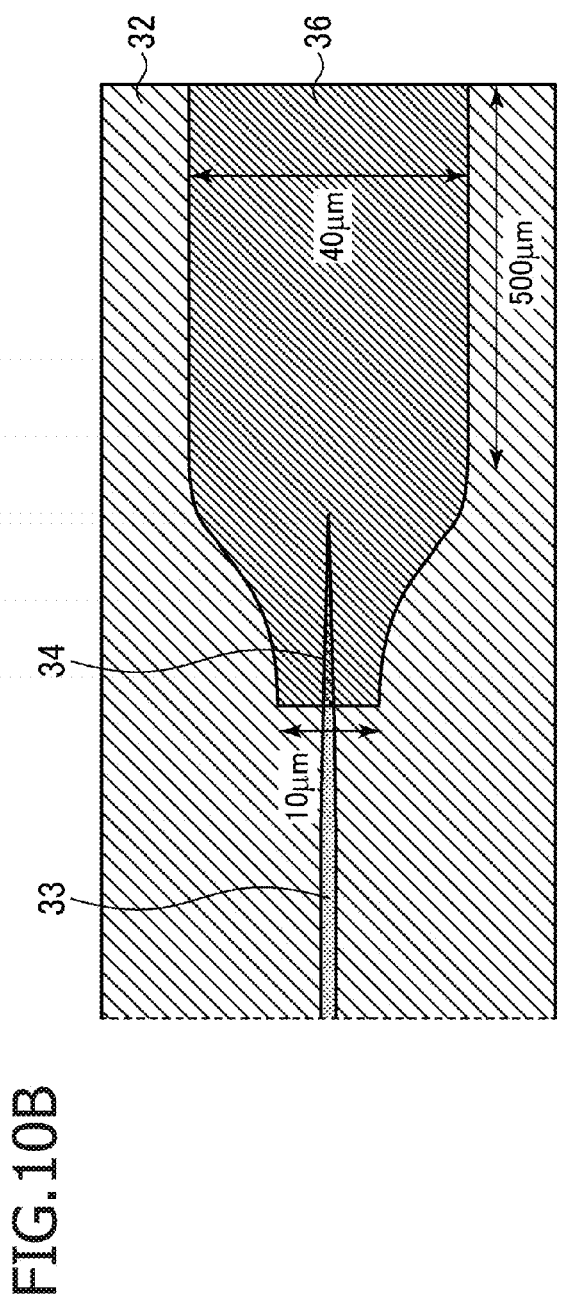

FIGS. 10A and 10B are diagrams illustrating the coupling portion in the optical fiber mounted photonic integrated circuit device according to Example 1 of the present invention. FIG. 10A is a cross-sectional diagram along the optical axis, and FIG. 10B is a plan diagram where the main portions can be clearly seen from the top. As illustrated in FIG. 10A, the thickness of the BOX layer 32 is 3 μm excluding the end portion, and the thickness of the end portion is 10 μm. As illustrated in FIG. 10B, the width of the end portion on the spot size converter 34 side in the SiON core 36 is 10 μm, the width of the end portion on the opposite side is 40 μm, and the length of the flat portion is 500 μm.

Figure 11A:
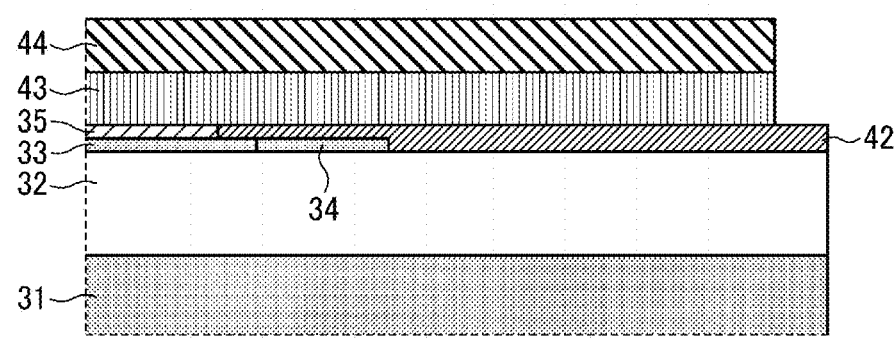
FIGS. 11A through 11C are diagrams illustrating the process for forming the SiON core in the optical fiber mounted photonic integrated circuit device according to Example 1 of the present invention.
Figure 11B:
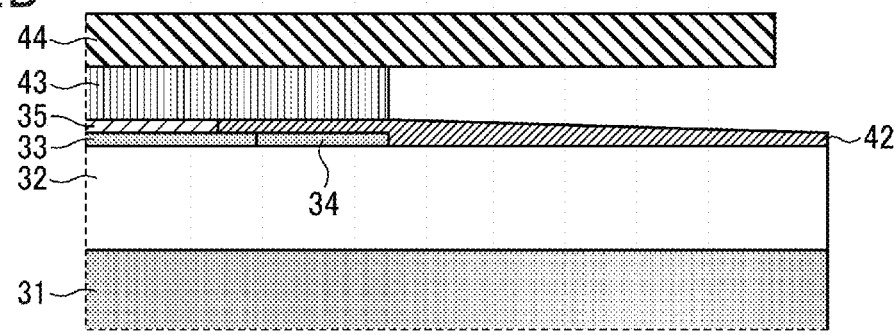
Figure 11C:
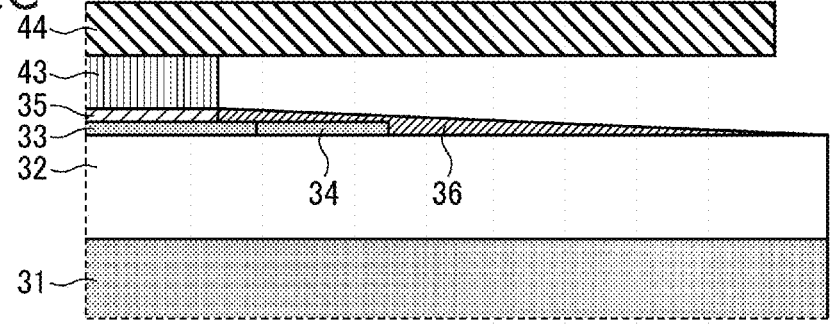

FIGS. 11A through 11C are diagrams illustrating the process for forming the SiON core in the optical fiber mounted photonic integrated circuit device according to Example 1 of the present invention. First, as illustrated in FIG. 11A, the single crystal Si layer on the BOX layer 32 is processed so as to form an Si fine wire core 33 and a spot size converter 34, on top of which an $SiO_2$ film is provided as an upper clad layer 35. Next, part of the upper clad layer 35 is removed, and then, a SiON film 42 is provided so as to cover the spot size converter 34 so that the thickness thereof is 0.25 μm above the spot size converter 34. Next, a metal film is provided, and then, a patterned resist 44 is provided in order to etch the metal film, and thus, a metal mask 43 is formed.

Next, as illustrated in FIG. 11B, etching is carried out using an etchant for the metal mask 43 and the SiON film 42. At this time, an etchant of which the etching rate is higher for the metal mask 43 is selected to etch the sides of the metal mask 43 so that the surface of the SiON film 43 that is exposed as the sides of the metal mask 43 are etched is sequentially etched so as to be in an inclined form.

When the etching is further progressed as illustrated in FIG. 11C, a tapered SiON core 36 of which the core thickness changes from 0.5 μm to 0 μm is gained. After that, the SiON core 36 is etched so as to be the form in a plane as illustrated in FIG. 9B. Here, the SiON film 42 may be etched in advance at the stage in FIG. 11A to the form in a plane as illustrated in FIG. 9B.

Figure 12:
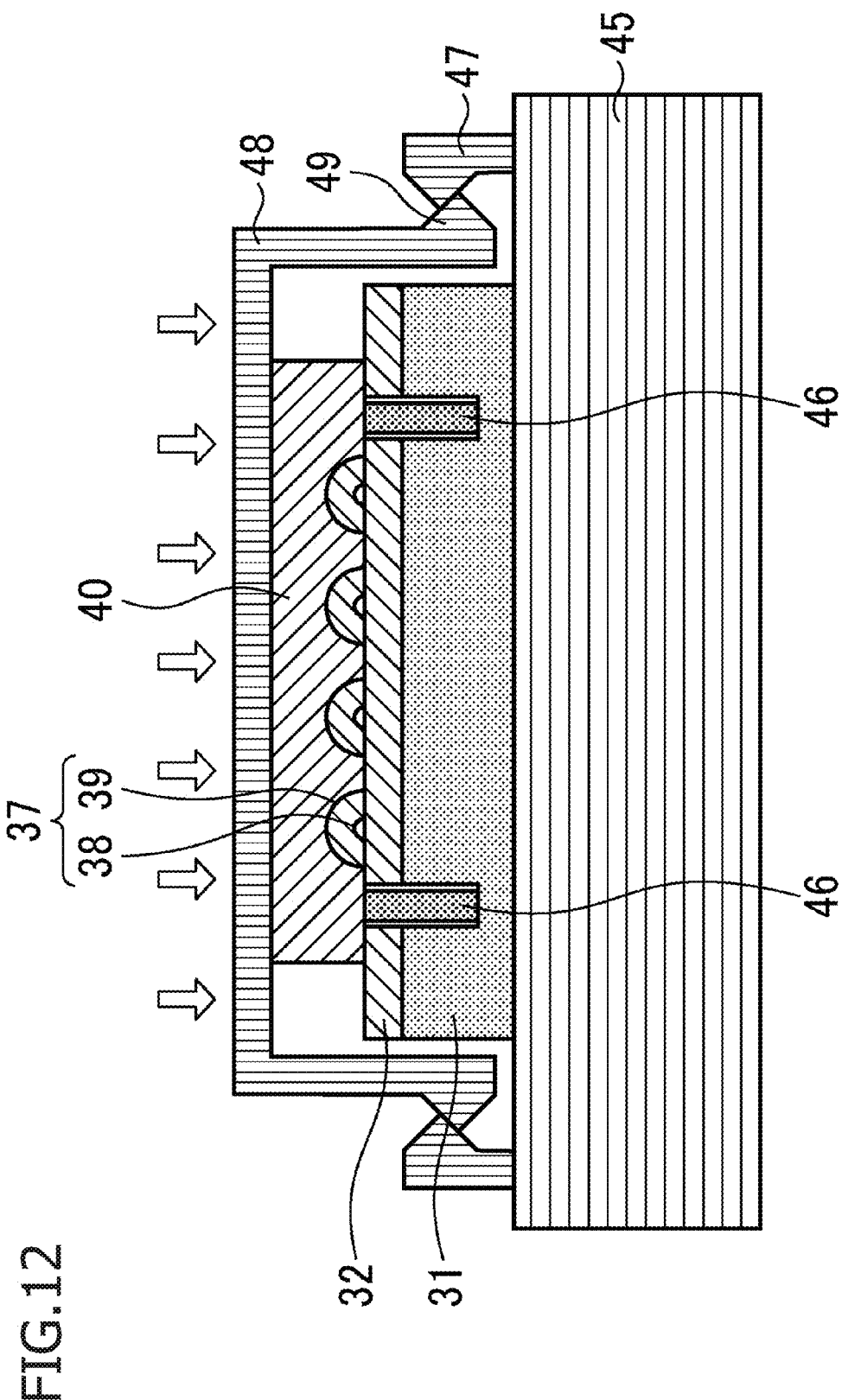
FIG. 12 is a diagram illustrating the mounting structure of the optical fiber mounted photonic integrated circuit device according to Example 1 of the present invention.

FIG. 12 is a diagram illustrating the mounting structure of the optical fiber mounted photonic integrated circuit device according to Example 1 of the present invention. The Si photonic integrated circuit device is mounted on a mounting substrate 45, and positioning pins 46 that are fixed to the ferrule 40 are inserted into the holes provided in the silicon substrate 31 for positioning. The shape of the positioning pins 46 may be columnar, prism-shaped or tapered. In addition, the material of the positioning pins 46 is generally a metal but may be a material other than metal.

When engagement members 47 provided to the mounting substrate 45 and engagement members 49 provided to the lid 48 for pressing the ferrule 40 are engaged with each other, the ferrule 40 is pressed toward the Si photonic integrated circuit device side by applying a load so that the state where the Si photonic integrated circuit device and the inclined connection end surface of the single mode optical fiber 37 are pressed against each other can be maintained.

The weight applying mechanism is not limited to the engagement mechanism illustrated in the figure, and any measure may be taken as long as the weight that is required to maintain the state where the Si photonic integrated circuit device and the inclined connection end surface of the single mode optical fiber 37 are pressed against each other can be applied. For example, the lid 48 placed on the ferrule 40 may be fixed with bolts or the structure may be provided with a spring through which weight is applied, but excessive weight can be prevented from being applied.

In Example 1 of the present invention, the SiON core 36 is tapered so that the thickness of the core is reduced and is connected to the inclined connection end surface of the single mode optical fiber 37, and therefore, the tolerance in the positioning for the coupling to the single mode optical fiber can be increased. Typically, the tolerance in the positioning for the coupling between the single mode optical fiber 37 and the Si fine wire core 33 can be improved by one digit in the lateral direction and by two digits in the direction of the optical axis. As a result, a simple positioning mechanism makes optical fiber connection possible, and thus, it becomes possible to achieve high coupling efficiency in a device mounted with an inexpensive mechanism.

EXAMPLE 2

Figure 13A:
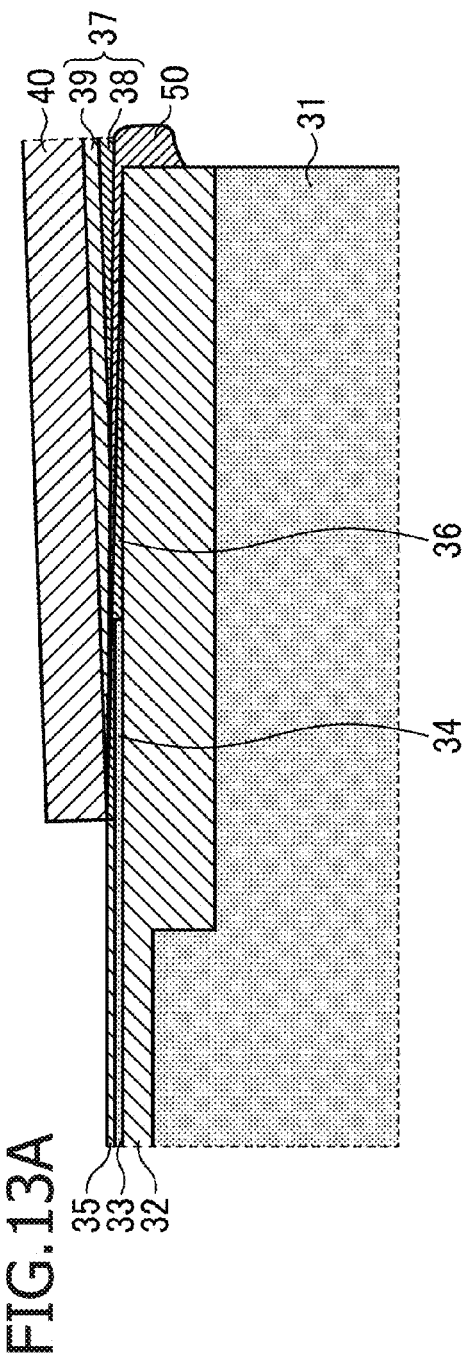
FIGS. 13A and 13B are diagrams illustrating the coupling portion in the optical fiber mounted photonic integrated circuit device according to Example 2 of the present invention.
Figure 13B:
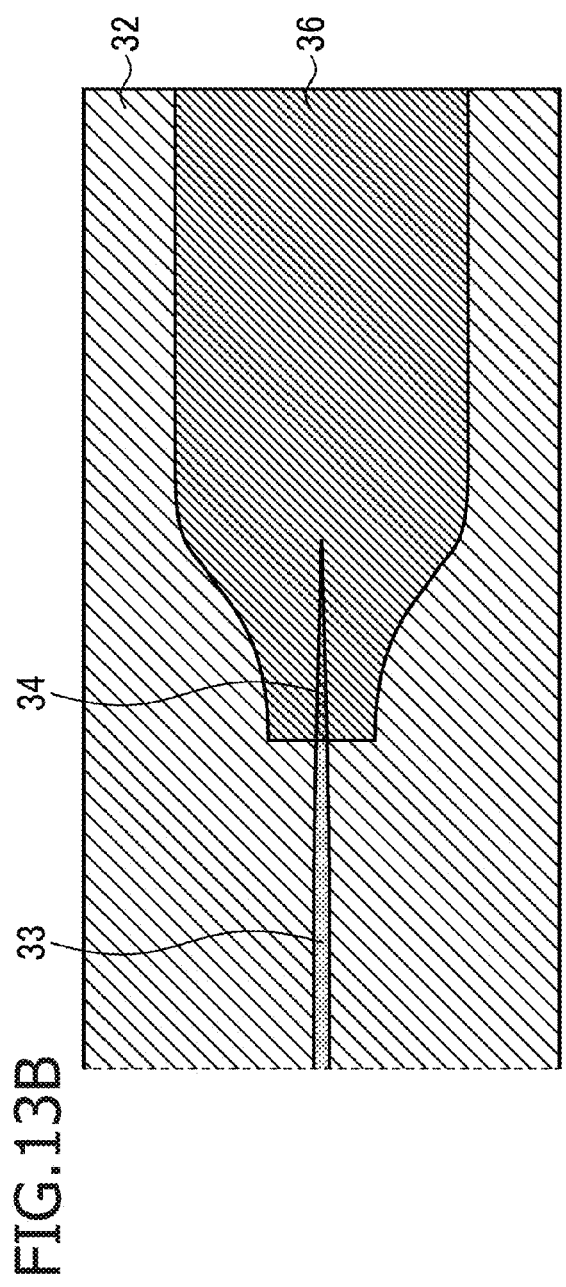

Next, the optical fiber mounted photonic integrated circuit device according to Example 2 of the present invention is described in reference to FIGS. 13A and 13B. FIGS. 13A and 13B are diagrams illustrating the coupling portion in the optical fiber mounted photonic integrated circuit device according to Example 2 of the present invention. FIG. 13A is a cross-sectional diagram along the optical axis, and FIG. 13B is a plan diagram where the main portions can be clearly seen from the top. The basic structure is the same as in Example 1. In Example 2 of the present invention, however, a transparent resin 50 is used for the transparent member instead of a transparent oil. GA700H (product number of resin made by NTT Advanced Technology (NTT-AT) Corporation) is used for the transparent resin.

In Example 2 of the present invention, the transparent resin 50 is used for the transparent member, and therefore, a weight applying mechanism is not essential in the case where the adhesiveness of the transparent resin 50 is sufficiently strong to maintain the state where the Si photonic integrated circuit device and the inclined connection end surface of the single mode optical fiber 37 are pressed against each other.

EXAMPLE 3

Figure 14:
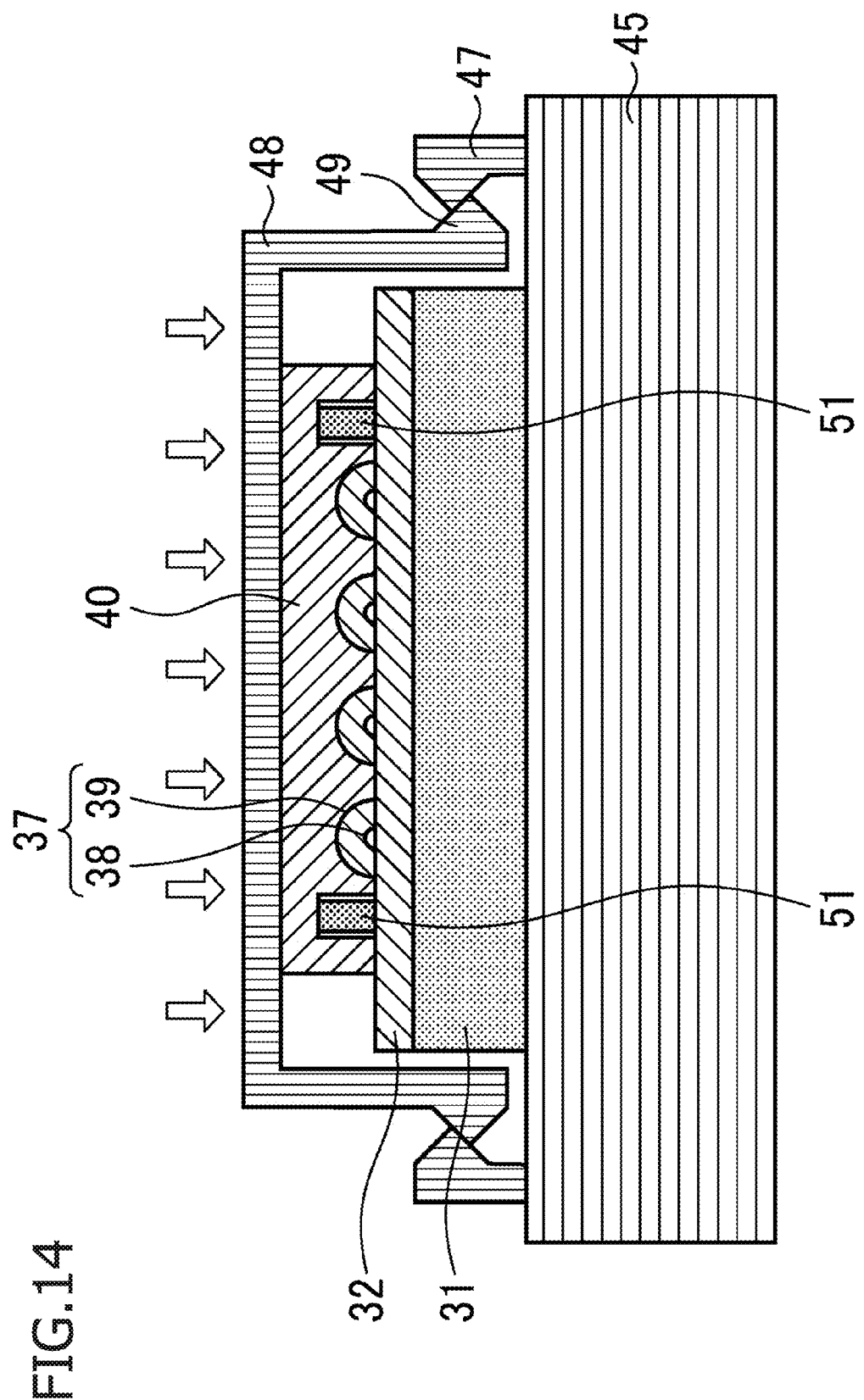
FIG. 14 is a diagram illustrating the mounting structure of the optical fiber mounted photonic integrated circuit device according to Example 3 of the present invention.

Next, the optical fiber mounted photonic integrated circuit device according to Example 3 of the present invention is described in reference to FIG. 14. FIG. 14 is a diagram illustrating the mounting structure of the optical fiber mounted photonic integrated circuit device according to Example 3 of the present invention. The basic structure is the same as in Example 1 illustrated in FIG. 12. In Example 3 of the present invention, however, positioning pins 51 are provided on the Si photonic integrated circuit device side in the structure so as to be inserted into the holes provided in the ferrule 40.

Here, the precision in positioning is more relaxed to the amount of several tens of μm due to the above-described improvement in the tolerance in the lateral direction, and therefore, the mechanism for positioning to this degree is not limited to the mechanisms illustrated in FIG. 12 or 14. For example, the step into which the external periphery of the ferrule 40 is engaged may be created in the Si photonic integrated circuit device for positioning. Alternatively, a step into which the external periphery of the Si photonic integrated circuit device is engaged may be created in the ferrule 40.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical fiber mounted photonic integrated circuit device, comprising:
   a photonic integrated circuit device configured to be provided with an optical waveguide on a substrate; and
   a single mode optical fiber having an inclined connection end surface configured to be optically coupled to the optical waveguide and incline relative to the direction in which light propagates, wherein
   the optical waveguide is formed of a first optical waveguide through which light propagates and a second optical waveguide that is coupled to the first optical waveguide on the input/output end side of the first optical waveguide,
   the cross-section of the core of the second optical waveguide is in the form of a slab having a width that is greater than the mode diameter of the single mode optical fiber, and the second optical waveguide is tapered in such a manner that the thickness of the core is reduced as the location is closer to the connection portion with the single mode optical fiber, and
   the inclined connection end surface of the single mode optical fiber and the upper surface of the core of the second optical waveguide face each other for coupling.

2. The optical fiber mounted photonic integrated circuit device according to claim 1, wherein the refractive index of the core of the second optical waveguide is smaller than the refractive index of the core of the first optical waveguide.

3. The optical fiber mounted photonic integrated circuit device according to claim 1, wherein the width of the core of the second optical waveguide gradually widens as the location is closer to the portion that is coupled to the single mode optical fiber.

4. The optical fiber mounted photonic integrated circuit device according to claim 1, wherein the width of the core of the second optical waveguide is two times or greater than the mode diameter of the single mode optical fiber.

5. The optical fiber mounted photonic integrated circuit device according to claim 1, wherein
   the photonic integrated circuit device is a silicon photonic integrated circuit device, and
   the core of the first optical waveguide is a silicon fine wire core.

6. The optical fiber mounted photonic integrated circuit device according to claim 5, wherein the core of the second optical waveguide is made of either SiON or Ge-doped $SiO_2$.

7. The optical fiber mounted photonic integrated circuit device according to claim 1, wherein a transparent member which is either a transparent liquid or resin that is transparent for the propagating light intervenes between the inclined connection end surface of the single mode optical fiber and the upper surface of the core of the second optical waveguide.

8. The optical fiber mounted photonic integrated circuit device according to claim 1, wherein the core of the first optical waveguide is tapered on the input/output end side.

9. The optical fiber mounted photonic integrated circuit device according to claim 1, further comprising a ferrule for fixing the single mode optical fiber, wherein
   the ferrule has a first engagement member, and
   the substrate of the photonic integrated circuit device is provided with a second engagement member that engages with the first engagement member.

10. The optical fiber mounted photonic integrated circuit device according to claim 9, wherein the optical fiber mounted photonic integrated circuit device further comprises a weight applying mechanism that can apply weight to the ferrule on the photonic integrated circuit side.

11. A photonic integrated circuit device, comprising:
    a substrate; and
    first and second optical waveguides provided on the substrate, wherein
    the second optical waveguide couples with the first optical waveguide on the input/output end side of the first optical waveguide,
    a cross-section of the core of the second optical waveguide is in the form of a slab, and the second optical waveguide is tapered in such a manner that the thickness of the core is thinner as the location is further away from the first optical waveguide, and
    the upper surface of the core of the second optical waveguide is a surface that is coupled to the single mode optical fiber.

12. The photonic integrated circuit device according to claim 11, wherein the width of the core of the second optical waveguide gradually widens as the location is closer to the portion that is coupled to the single mode optical fiber.

* * * * *